United States Patent [19]

Clark et al.

[11] E Patent Number: Re. 31,776

[45] Reissued Date of Patent: Dec. 25, 1984

[54] RESIN REINFORCED EXPANSION ANCHOR AND METHOD OF INSTALLATION

[75] Inventors: Carl A. Clark, Liverpool; John Rogala, Syracuse, both of N.Y.

[73] Assignee: The Eastern Company, Naugatuck, Conn.

[21] Appl. No.: 77,770

[22] Filed: Sep. 21, 1979

Related U.S. Patent Documents

Reissue of:

[64] Patent No.: 4,162,133
Issued: Jul. 24, 1979
Appl. No.: 882,797
Filed: Mar. 2, 1978

U.S. Applications:

[63] Continuation-in-part of Ser. No. 835,367, Sep. 21, 1977, abandoned.

[51] Int. Cl.[3] ..... E21D 20/02

[52] U.S. Cl. ..... 405/261; 411/45; 411/49

[58] Field of Search ..... 405/259, 260, 261, 262; 411/44, 45, 49, 55, 57, 82

[56] References Cited

U.S. PATENT DOCUMENTS 3,702,060 11/1972 Cumming ..... 405/261
4,011,787 3/1977 White ..... 405/259 X

FOREIGN PATENT DOCUMENTS 558463 7/1957 Belgium .
375314 4/1964 Switzerland .

*Primary Examiner*—David H. Corbin
*Attorney, Agent, or Firm*—Charles S. McGuire

[57] ABSTRACT

A mine roof bolt and expansion anchor are provided with means preventing relative rotation of the two in a direction tending to withdraw the bolt from the tapered nut of the anchor while allowing relative rotation in the opposite direction, whereby the bolt may be rotationally advanced into the nut as the anchor remains rotationally stationary to effect expansion of the anchor shell within a drill hole. A conventional, two-compartment resin cartridge is inserted into the drill hole ahead of the end of the bolt carrying the anchor. The cartridge is ruptured and the contents thereof mixed by advance of the bolt and anchor while rotating in the direction preventing relative rotation. Immediately thereafter the bolt is rotated in the opposite direction, thereby expanding the anchor and firmly securing it in the hole. The bolt may then be immediately loaded without regard to the setting time of the resin. Three embodiments are disclosed of the means providing the aforementioned relative rotational action. In one embodiment stop means are associated with the tapered nut for engagement by a pin extending from the threaded end of the bolt only when the latter is rotated in the direction tending to withdraw it from the nut. In a second, the stop means are associated with the base of the expansion shell and are engaged by radially extending ears on the bolt. In the third embodiment, the expansion shell is conventional in all respects and a separate collar member is carried upon the bolt shaft for engaging portions of the shell and providing the desired rotational relationships of bolt and anchor.

41 Claims, 14 Drawing Figures

RESIN REINFORCED EXPANSION ANCHOR AND METHOD OF INSTALLATION

Matter enclosed in heavy brackets [ ] appears in the original patent but forms no part of this reissue specification; matter printed in italics indicates the additions made by reissue.

REFERENCE TO RELATED APPLICATION

This is a continuation-in-part of U.S. application Ser. No. 835,367 of the same inventors, filed Sept. 21, 1977, and now abandoned.

BACKGROUND OF THE INVENTION

The present invention relates to rock reinforcing apparatus and methods and, more specifically, to a combined mechanical-resin rock bolt anchoring system such as typically used in the support of mine roofs, and the like.

In mine work, such as coal mining, or in underground formations such as tunnels or excavations, it is often necessary to reinforce or support the roof and/or walls of the excavating to prevent rock falls or cave-ins. The most common means presently in use for effecting such support include elongated bolts or bars which are inserted in blind drill holes to hold a metal support plate in close engagement with the rood or wall surface. The bolt or bar is securely fixed in the hole by anchoring means such as a mechanical expansion anchor, a hardenable resin which surrounds the end of the bolt within the hole, or both.

Many variations of the basic mine roof expansion anchor have been proposed and numerous styles and models are currently in wide-spread use. Common attributes of such anchors are the expansion shell, or other such radially expansible members, and a tapered nut having a threaded opening into which one end of the rock bolt may be threadedly advanced. As the bolt is rotated with the shell and nut constrained against rotation, the nut is gradually drawn into the shell to cause radial expansion thereof into tightly engaged contact with the wall of the drill hole.

Resin anchoring is also commonly used to fixedly secure the rock bolt or bar in the drill hole. The use of polyester resins in underground formation was disclosed at least as early as the June 4, 1963, U.S. Pat. No. 3,091,935 of Brown and Pritchard entitled "Rock Treatment." It has been found expedient to provide the resin grouting materials in two components each of which remains in a semi-liquid or thixotropic phase until mixed with the other, whereupon curing progresses to the stage that the steel bolt or bar will fail before the resin bond fails. The two components, a polyester resin and a catalyst, curing or hardening agent, are commonly provided in a single cartridge wherein they are a single cartridge wherein they are physically separated in individual compartments, such as disclosed, for example, in U.S. Pat. No. 3,324,663. Upon insertion of the resin cartridge and bolt into the drill hole the rock bolt or reinforcing bar itself, or other suitable means, is used to rupture the resin cartridge and mix the two components so that the curing and hardening necessary to retain the bolt in the hole may take place.

In addition to the many varieties of mechanical anchors and resin grouting systems used individually, it has also been proposed to combine the two so that a rock bolt or reinforcing bar may be secured by both anchoring systems. Such a dual anchoring system is disclosed, for example, in Montgomery U.S. Pat. No. 3,618,326 wherein a conventional expansion anchor is used in combination with a novel two-compartment resin cartridge. U.S. Patent No. 3,702,060 likewise discloses a conventional expansion anchor threaded on the end of rock bolt and modified to carry a special resin container. Other U.S. patents, such as U.S. Pat. Nos. 2,829,502 of Demsey, 3,188,815 of Schuermann, et al, and aforementioned 3,324,663 of McLean, disclose the combination of expansible shell mechanical-type anchors with resin grouting systems.

OBJECTS OF THE INVENTION

The roof bolting systems of the prior art which combine mechanical and resin anchoring depend, for the most part, upon special packaging of the resin materials which are released and mixed by threaded advancement of the bolt into the expansion anchor or by means external to the drill hole. Where the bolt is threaded into the expansion anchor nut as mixing takes place, the mixture may be incomplete when the bolt reaches the limit of its travel. Considerable savings in fabrication and installation costs could be achieved by using conventional resin packages in combination with expansion anchors and bolts which are structurally modified, but not significantly more expensive than, presently existing anchors and which permit immediate loading after a simple and rapid installation.

Accordingly, it is a principal object of the present invention to provide a combined mechanical-resin rock bolting system wherein a conventional resin package is used and installation allowing full loading immediately after setting the mechanical anchor is rapidly effected.

A further object is to provide a rock bolt and expansion anchor assembly having cooperative structure on the bolt and anchor which enhances use of the assembly in combination with a frangible resin cartridge.

Another object is to provide a novel mine roof expansion anchor having structural attributes which promote its use in improved anchorage systems.

A still further object is to provide a novel method of installing in a drill hole a combined mechanical-resin type bolt anchoring system.

Still another object is to provide novel structure for use with a mine roof bolt and expansion anchor assembly in order to control in a desired manner the relative rotatability of the bolt and anchor.

Other objects will in part be obvious and will in part appear hereinafter.

SUMMARY OF THE INVENTION

In accordance with the foregoing objects, the invention contemplates the use of a conventional resin cartridge with a rock bolt and expansion anchor which, although otherwise conventional, include cooperative structure affecting their relative rotatability. That is, the anchor may be held stationary in the usual manner as the bolt is rotated in the direction of threaded advancement into the tapered nut of the anchor, thereby radially expanding the anchor shell as the nut is moved axially thereinto. However, once the anchor nut has been threaded onto the bolt to a predetermined extent, the cooperative structure formed integrally with and/or carried upon the bolt and/or anchor prevents relative rotation of the two in a direction tending to unthread or withdraw the bolt from the nut. Thus, as the bolt is counter-rotated the anchor rotates therewith as a single unit and the bolt and nut are not disengaged, but upon rotation in a direction advancing it into the threads of the nut the anchor may be held rotationally stationary to permit axial movement of the nut into the shell, with consequent expansion of the latter into firm engagement with the surrounding walls of a drill hole.

A conventional, two-compartment resin capsule is inserted in a blind drill hole formed for such purpose in the structure to be supported. The rock bolt and anchor assembly are inserted into the hole behind the capsule to support the latter on the end of the bolt carrying the anchor. The head of the bolt carries a support plate in the usual manner.

The bolt head is engaged by a socket tool forming a portion of a conventional bolting machine and forced into the hole against the resin cartridge as it is counter-rotated, i.e., turned in a direction tending to unthread the bolt from the nut, but instead rotating the bolt and anchor as a single unit. This serves to rupture the resin cartridge and mix the contents of the two compartments thereof.

After counter-rotation of the bolt and anchor assembly to the extent required to effect complete mixing of the resin grouting components, the direction of rotation of the socket tool is immediately reversed. The anchor will then be held rotationally stationary by the wall of the drill hole as the bolt is rotated. The tapered nut will thus be moved axially into the anchor shell, causing radial expansion thereof into tight engagement with the wall of the drill hole. The socket tool may then be immediately removed from the head of the bolt without regard to the setting time of the resin since it is no longer required for support.

DETAILED DESCRIPTION

Figures 1, 2, 3, 4, 5:
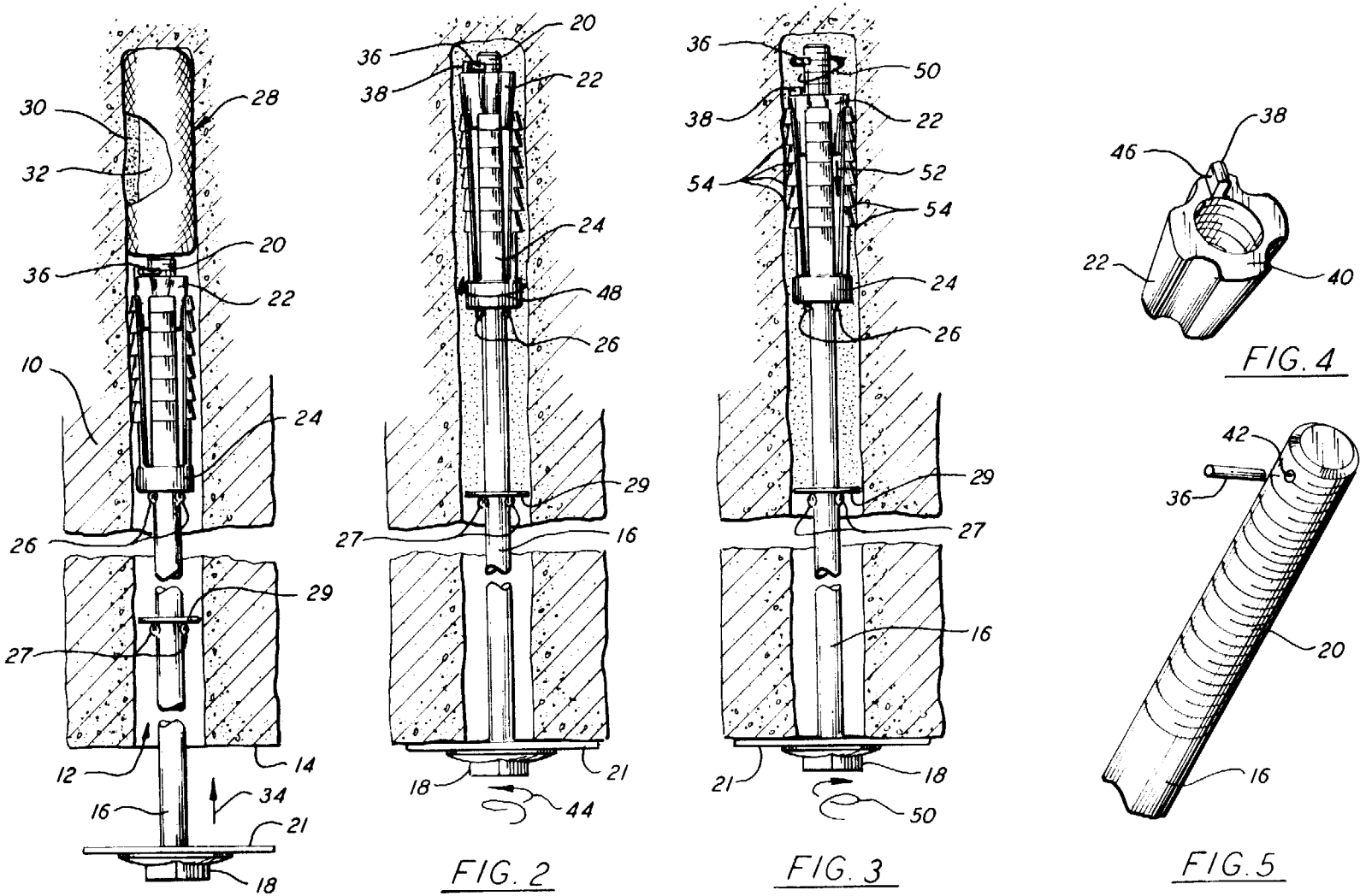
FIG. 1 is a cross sectional view through a rock structure having a drill hole formed therein showing, in front elevation, a first embodiment of the rock bolt and anchor construction of the invention inserted in the hole together with a resin cartridge, thereby also illustrating an initial step in the method of the invention.
FIG. 2 is a like view showing the elements at a subsequent stage of the anchoring operation.
FIG. 3 is a like view showing the elements in their final positions anchoring the rock bolt in the drill hole.
FIG. 4 is a perspective view of the tapered nut of the anchor bolt construction of FIGS. 1-3.
FIG. 5 is a fragmentary, perspective view of the end of the bolt of the FIGS. 1-3 construction.
Figure 9:
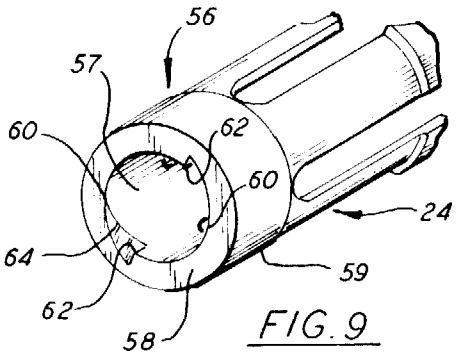
FIG. 9 is a fragmentary, perspective view of the lower portion of the anchor shell construction of FIGS. 6-8.
Figure 10:
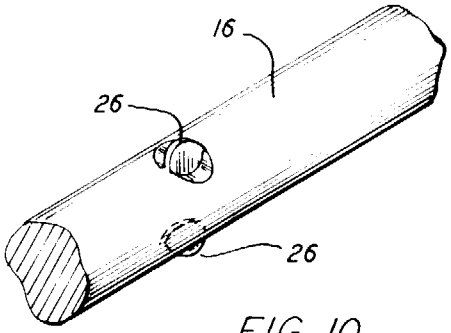
FIG. 10 is a fragmentary, perspective view of a portion of the rock bolt of FIGS. 6-8.
Figure 8:
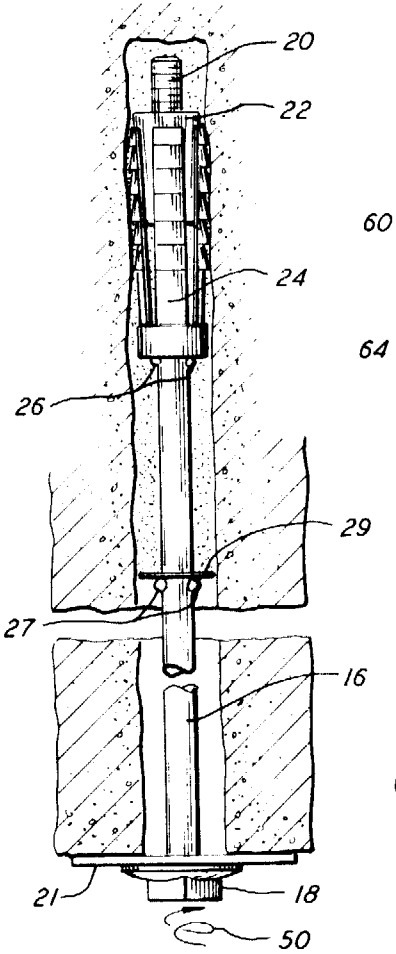
FIGS. 6-8 are a series of views corresponding to FIGS. 1-3 and showing a second embodiment of bolt and anchor construction.
Figure 7:
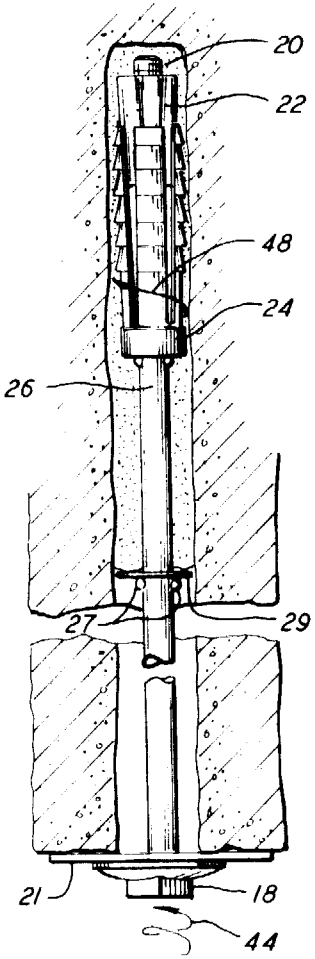
Figure 6:
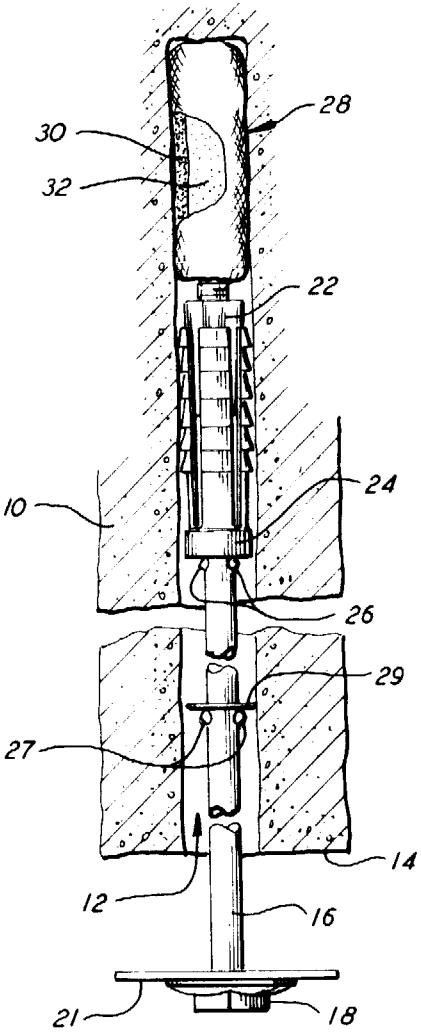

Referring now to the drawings, in FIGS. 1-3 is shown a cross section of a rock structure 10, such as the roof of a coal mine, in which a blind drill hole 12 has been formed with conventional drilling tools for the purpose of installing elements which will serve to support surface 14 and the surrounding rock structure. Elongated rock bolt 16 has a square head 18 at one end and is threaded for a portion of its length from the other end 20. Support plate 21 is carried upon headed end 18 of bolt 16.

An expansion anchor comprising tapered nut 22 and expansion shell 24 is carried upon threaded end 20 of bolt 16. The smaller end of nut 22 extends into the upper end of shell 24, the lower end of which is supported by ears 26 extending integrally from bolt 16 although other conventional support means such as wire bails, so-called Palnuts, and the like may alternatively be used. A second set of ears 27 at a position further from end 20 than ears 26 serve to support a washer-like member 29, the purpose of which will be explained later.

Conventional resin cartridge 28 includes two compartments physically separating components 30 and 32 of a resin grouting mix. Such cartridges are commercially available from a variety of sources and include a polyester resin as one of the components and a reaction agent such as a catalyst or curing or hardening agent as the other. The two components remain in a semi-liquid or thixotropic phase until mixed, whereupon the resin begins to solidify. Curing and solidification continue until an extremely strong bond is formed by the resin grout.

As seen in FIG. 1, cartridge 28 has been placed in bore hole 12 and is supported therein upon end 20 of bolt 16. Cartridge 28 is forced against the end of hole 12 as bolt 16 is moved upward as indicated in FIG. 1 by arrow 34. Head 18 is engaged by a socket tool (not shown) such as employed in bolting machines commonly used in coal mines and elsewhere, which is power-driven to move the bolt upwardly into the drill hole and to rotate it in either direction. End 20 of bolt 16 and nut 22 are threaded in the conventional manner so that clockwise rotation of the bolt advances it into the threads of the nut. In conventional rock bolt and anchor assemblies, counter-clockwise rotation of the bolt would simply disengage it from the nut since the anchor is restrained to some extent from rotation by contact with the interior of the drill hole.

The bolt and anchor assembly of the present invention include cooperable structure for preventing relative rotation in a counterclockwise direction from the relative position of the bolt and anchor shown in FIG. 1. Such structure comprises, in the embodiment of FIGS. 1-5, fixed pin 36 extending radially from bolt 16 at end 20 thereof and boss 38 extending integrally from upper surface 40 (FIG. 4) at the larger end of tapered nut 22. Pin 36 is inserted into hole 42 (FIG. 5) in end 20 of the bolt after the latter has been threaded through nut 22, preferably to an extent that hole 42 is beyond the end of boss 38.

As bolt 16 is continued to be moved upwardly from the position of FIG. 1 to that of FIG. 2, it is rotated in a counterclockwise direction, as indicated by arrow 44 in FIG. 2. Either on the first or a subsequent revolution, as bolt 16 tends to be unthreaded from nut 22, pin 36 will contact surface 46 (FIG. 4) of boss 38, preventing further relative counterclockwise rotation of the bolt and anchor. The anchor will then rotate with the bolt, as indicated by arrow 48, as the bolt is advanced, thereby serving to rupture cartridge 28 and effect thorough mixing of the two components 30 and 32 thereof. Immediately after bolt 16 has been fully inserted to bring support plate 21 into contact with surface 14 and sufficient counterclockwise rotation of bolt and anchor has occurred to achieve thorough mixing, the direction of rotation is reversed. Since bolt 16 was counterrotated to bring pin 36 into contact with surface 46, the pitch of the threads will advance the bolt sufficiently that upon one complete clockwise revolution there will no longer be an interference between the pin and boss. Therefore, the anchor may remain rotationally stationary as the bolt is rotated in a clockwise direction, as indicated by arrows 50 in FIG. 3, thereby moving nut 22 downwardly into the end of shell 24, as indicated by arrow 52. As the larger end of nut 22 begins to move into the shell, radial expansion occurs in the usual manner to cause teeth 54 on the outside of shell 24 to bite into the rock surface within drill hole 12, thus firmly anchoring bolt 16.

The mixed resin components will fill the space within the drill hole around end 20 of the bolt and the anchor, washer member 29 serving to limit the extent by which the semi-liquid mixture can flow downwardly. After hardening, which requires varying amounts of time depending on the type of resin mix used, an extremely strong bond is formed to anchor bolt 16 essentially permanently in drill hole 12. With most currently available resin cartridges, counterclockwise spin for 10 to 20 seconds at the usual bolting machine speeds of 600 to 1,000 rpm is sufficient to achieve thorough mixing, and 10 to 20 seconds of clockwise rotation is sufficient to set the anchor. Thus, the entire operation may be completed in about a half minute or less, and the bolting machine may be immediately disengaged from the bolt head without regard to the setting time of the resin grouting mix.

In the embodiment of FIGS. 6–10, reference numerals common to those used in description of the embodiment of FIGS. 1–5 are used to denote corresponding elements in the two constructions. In this construction nut 22 has no boss, being entirely conventional, and bolt 16 is not fitted with a pin at end 20. Ears 26 which serve to support shell 24 upon bolt 16 in both constructions also serve here as the fixed members which extend radially from the bolt for contact with cooperating structure on the anchor, in this case provided on the shell rather than the nut. Shell 24 includes at its base a collar-like portion 56, as is conventional with expansion anchor shells. In the illustrated form, collar 56 is a unitary, continuous structure, having miner and outer cylindrical surfaces 57 and 59, respectively, joined at the base of the shell by planar, annular surface 58.

A pair of spiral or tapered surfaces are formed in the base of collar 56 beginning at points 60 at the juncture of surfaces 57 and 58 and extending gradually deeper into the collar to terminate at steps 62. One of the tapered surfaces may be seen in FIG. 9 and is denoted by reference numeral 64. Surfaces 64 are widest at steps 62, which lie at 180° opposite one another and in planes substantially radial with respect to the shell, which are narrower than the distance between inner and outer surfaces 57 and 59. It may be seen that, with surface 58 of shell 24 resting upon ears 26, when bolt 16 is rotated in a counterclockwise direction, as in FIG. 7, ears 26 will contact stepped surfaces 62 and rotate the anchor together with the bolt. When the bolt is rotated clockwise, as in FIG. 8, the anchor may be held rotationally stationary as ears 26 travel about surface 58, over steps 62 and across tapered surfaces 64 to again ride on surface 58. Thus, nut 22 may be drawn into shell 24 to effect radial expansion thereof in the same manner as the previously described embodiment.

Turning now to FIGS. 11–14, the invention is disclosed in an embodiment which requires modification of neither the nut nor the shell of the expansion anchor. Instead, a separate element is carried upon the bolt stem for cooperative engagement with portions of the conventional expansion anchor. The element is preferably formed as a stamping from flat sheet metal of suitable gage and then bent to the desired shape. In any case, the material must have some degree of resilience or flexibility in order that portions thereof may return to an original or unflexed position after being temporarily bent away from such position, and is therefore preferably of spring steel or similar material.

Figure 11:
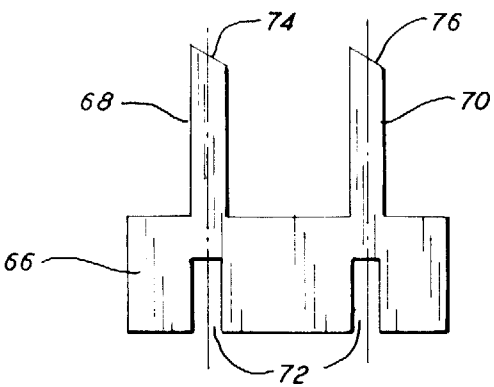
FIG. 11 is a front elevational view of a metal stamping to be formed into an element used in another embodiment of the invention.
Figure 14:
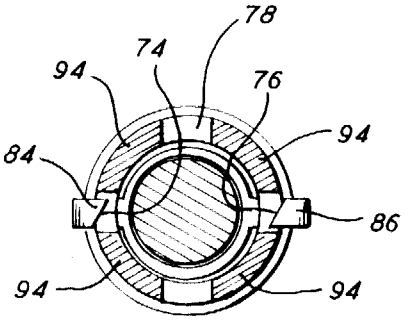
FIG. 14 is a sectional view on the line 14—14 of FIG. 13.

The stamping is shown in FIG. 11 and includes a generally rectangular base portion 66 with two relatively narrow legs 68 and 70 extending integrally from one edge thereof. A pair of slots 72 extend into the opposite edge. Edges 74 and 76 forming the free ends of legs 68 and 70 are cut at an angle (of other than 90°) with respect to the parallel side edges of the legs, which lie at 90° to the edge of base portion 66 from which they extend.

Figure 12:
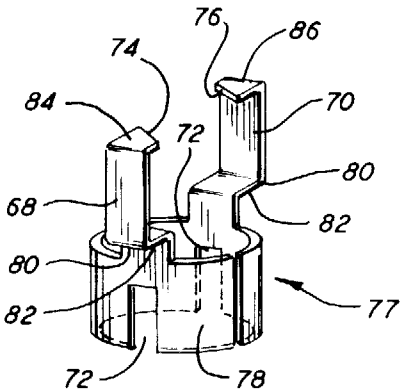
FIG. 12 is a perspective view of the element after forming and mounting upon the bolt-anchor assembly in another embodiment of the invention.

After the stamping is cut from the sheet metal blank in the usual manner, legs 68 and 70 and base portion 66 are permanently bent to place the element in the configuration shown in FIG. 12, wherein it is generally denoted by reference numeral 27. The base now forms a cylindrical collar 78 with legs 68 and 70 spaced at 180°, as are slots 72. Each leg is bent twice, at 80 and 82, near its connection with collar 78 and the free ends are bent to form inwardly facing tabs 84 and 86.

Element 77 is formed with the inside diameter of collar 78 thereof slightly larger than the diameter of the roof bolt with which it is to be used. It is mounted upon bolt 16 simply by inserting the threaded end of the bolt through collar 78 and moving element 77 down the bolt until ears 26 on the bolt stem enter slots 72, thus supporting element 77 upon the bolt and preventing relative rotation of the two in either direction. A conventional expansion anchor, denoted generally by reference numeral 88 in FIG. 13 and including tapered nut 90 and shell 92, is then assembled with bolt 16 in the usual manner. That is, the threaded end of the bolt is placed through the open end of shell 92 and threaded into nut 90.

As anchor 88 is moved downwardly on bolt 16 during threaded advancement thereof through nut 90, legs 68 and 70 are flexed apart to the extent necessary to allow the lower or open end of shell 92, which constitutes a continuous, circular base, to pass between the inner ends of tabs 84 and 86. Conventional expansion anchor shells include a plurality of fingers extending integrally from the circular base, shell 92 having a total of four such fingers, each denoted by reference numeral 94, with spaces between the adjacent fingers.

Figure 13:
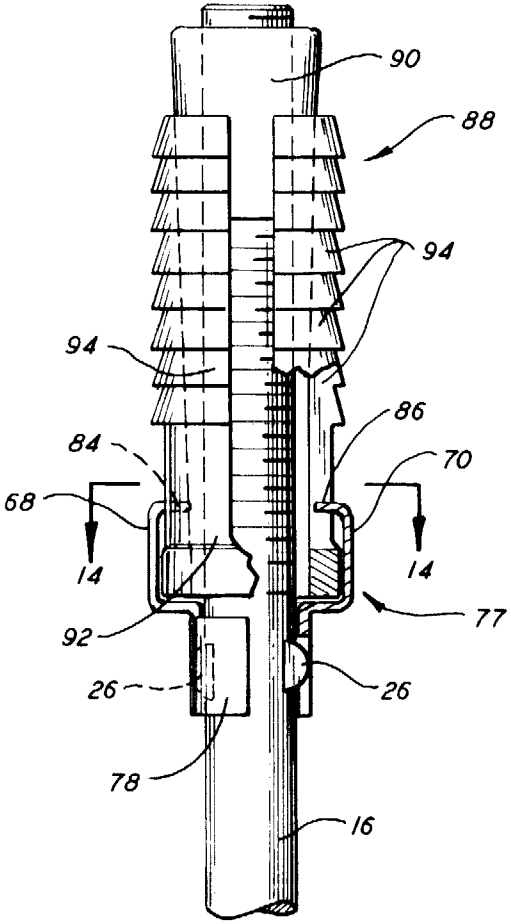
FIG. 13 is a fragmentary, side elevational view of a bolt-anchor assembly with the element of FIG. 11 mounted thereon, the element and a portion of the anchor being shown in half section.

After advancement of the threaded end of bolt 16 into nut 90 by a sufficient distance, the assembly will appear as in FIG. 13 with collar 78 of element 77 encircling bolt 16, ears 26 of which extend into slots 72 of the collar, and tabs 84 and 86 extending into spaces between fingers 94 on opposite sides of shell 92. This is also apparent in the sectional plan view of FIG. 14. Since ears 26 are positioned in slots 72, rotation of bolt 16 in either direction will result in like rotation of element 77. Rotation in one direction will bring angled edges 74 and 76 of tabs 84 and 86 into contact with the vertical edges of two of fingers 94 between which the tabs are positioned, while rotation in the opposite direction will bring the straight side edges of the tabs into contact with the vertical edges of the other two fingers 94. When frictional resistance to rotation of anchor 88 is provided, as when the anchor contacts the inside of a drill hole, bolt 16 and element 77 may rotate in a counterclockwise direction, viewed from above as in FIG. 14, while anchor 88 is held stationary by the frictional resistance. That is, the bolt and element may rotate relative to the anchor since legs 68 and 70 will flex outwardly as element 77 is rotated with angled edges 74 and 76 in contact with fingers 94. Although legs 68 and 70 flex inwardly again when tabs 84 and 86 are aligned with the next succeeding spaces between fingers 94, they are again flexed outwardly by continued rotation of the bolt and element with the anchor held stationary.

On the other hand, when bolt 16 is rotated in a clockwise direction as viewed from above, the vertical edges of fingers 94 are contacted by the straight edge portions of tabs 84 and 86 which are essentially perpendicular to the edges of the fingers. Thus, there is no outward flexure of legs 68 and 70, as in the opposite direction of rotation of the bolt and element; the frictional resistance to rotation of anchor 88 is overcome and there is no relative rotation, i.e., anchor 88 rotates together with bolt 16 and element 77. Since counterclockwise rotation viewed from above is clockwise when viewed from below, and vice versa, and clockwise rotation will advance a right-hand threaded bolt into a stationary nut, rotation of bolt 16 in a direction advancing it into nut 90 will allow anchor 88 to be held stationary during such rotation with consequent axial movement of nut 90 into shell 92 and expansion of the latter.

Thus, it can be seen that the FIGS. 11–14 embodiment of the invention provide operation in the same manner as the other two, except that a separate element is utilized instead of a modification of the shell or bolt structure. Since ears 26 on bolt 16 serve to support element 77 and the base of shell 90 is supported on collar 78 of the element, no bail, Palnut, or other such means is required to support the anchor upon the bolt as is the case with other conventional expansion anchor assemblies. The bolt and anchor assembly may be inserted into a drill hole behind a frangible plastic container holding the resin in its separated, 2-component form. Rotation of the bolt in a counterclockwise direction as seen from below (clockwise as seen from above, as in FIG. 11) will serve to rotate element 77 and anchor 88, thereby fracturing the resin container and mixing the chemical components. Reversal of the direction of rotation will allow anchor 88 to be held stationary as bolt 16 and element 77 are rotated, with shell 92 being expanded into tightly engaged contact with the drill hole. The present embodiment thus provides the same control of relative rotation of bolt and anchor as the previously described embodiments, allowing relative rotation in the direction of threaded advancement of the roof bolt into the expansion anchor nut and preventing relative rotation in the opposite direction. Although in the form shown and described the separate element is positively driven in both directions by rotation of the bolt and transmits such rotation to the anchor in only one direction, the reverse of this operation could be provided if desired. That is, the separate element could be carried upon the anchor and arranged relative to cooperable portions of the bolt for rotation thereby in only one direction. It should also be noted that element 77 could be affixed directly to bolt 16 for transmission of rotation from the bolt to the element, thereby requiring no ears or other lateral projections or modifications of the standard bolt construction.

From the foregoing it is apparent that the present invention provides a method of combined mechanical-resin rock bolt anchoring which is advantageous, among other reasons, in that it greatly reduces the time required for the bolting machine to complete an anchorage installation while utilizing entirely conventional resin packages. The invention is practised with, and also encompasses, novel expansion anchor structure wherein cooperable portions of the bolt and anchor allow the bolt to be counter-rotated without unthreading from the tapered nut, and novel elements carried upon but separate from the bolt to provide the same action without modification of the anchor structure.

What is claimed is:

1. A combined resin-mechanical system for anchoring a bolt in a drill hole in a mine roof, or the like, said system comprising:

(a) an elongated bolt having a head at one end and threaded from the opposite end for at least a portion of its length;

(b) an expansion anchor including a hollow, radially expansible shell and a tapered nut having large and small ends, the latter being disposed in one end of said shell, said bolt extending axially through said shell and threaded into said nut;

(c) a destructible capsule containing quick-setting adhesive and catalyst hardener resin materials in separate compartments, said capsule being rupturable upon advance of said bolt thereinto for mixture and hardening of said resin materials about said bolt within a drill hole; and (d) means providing rotation of said anchor together with and in response to rotation of said bolt in one direction and allowing said anchor to be held rotationally stationary as said bolt is rotated in the opposite direction for threaded advancement into said nut, thereby expanding said shell for engagement of the outer surface thereof with the interior of the drill hole.

2. The invention according to claim 1 wherein said means includes a fixed member extending radially outward from said bolt.

3. The invention according to claim 2 wherein said means further includes a boss extending from the large end of said nut in a direction axially thereof.

4. The invention according to claim 3 wherein said fixed member comprises an element extending from the end of said bolt on the opposite side of said nut from said one end of the bolt.

5. The invention according to claim 3 wherein said boss is formed integrally with said nut.

6. The invention according to claim 2 wherein said shell includes a collar having inner and outer cylindrical surfaces and a planar face at the end opposite said one end, and said means further includes a spiral surface extending into said planar face and inner surface in the same direction as the threads on said bolt, said tapered surface terminating in a step lying in a plane substantially radial with respect to said shell.

7. The invention according to claim 6 wherein said fixed member comprises an element extending from said bolt in contacting relation with said planar face of said collar.

8. The invention according to claim 7 wherein said tapered surface extends into said inner cylindrical surface of said collar, being narrower at its widest point than the distance between said inner and outer surfaces of said collar, and said fixed member terminates at a radial distance from the axis of said bolt which is greater than the radial distance therefrom of said inner cylindrical surface of said collar and less than the radial distance therefrom of the outer terminus of said step.

9. The invention according to claim 8 wherein said means comprises a pair of said tapered surfaces each extending for less than 180°, about the periphery of said inner cylindrical surface of said collar and terminating in steps spaced by 180°, and a pair of said fixed members each terminating at a radial distance from the axis of said bolt which is greater than the radial distance therefrom of said inner cylindrical surface of said collar and less than the radial distance therefrom of the outer terminus of said step, said fixed members being spaced from one another by 180° about the periphery of said bolt.

10. The invention according to claim 1 wherein said means includes a separate element carried upon one of said bolt and said anchor, and having portions cooperatively engageable with both said bolt and anchor to transmit rotation from said bolt to said anchor in one direction only.

11. The invention according to claim 10 wherein said shell includes a plurality of axially extending, circumferentially spaced fingers and said element comprises a collar portion at least partially encircling said bolt and at least one flexible leg having an end portion extending laterally into the space between adjoining ones of said fingers.

12. The invention according to claim 11 wherein said bolt includes a fixed member extending radially outwardly therefrom through a portion of said collar for transmitting rotation in both directions from said bolt to said element.

13. The invention according to claim 12 wherein said end portion includes one edge arranged substantially perpendicular to the opposing edge of one of said adjoining fingers between which said end portion extends, and a second edge arranged at an acute angle with respect to a line perpendicular to the opposing edge of the other of said adjoining fingers, whereby rotation of said element in the direction of said one edge is transmitted to said anchor and rotation of said element in the direction of said second edge allows said anchor to be held rotationally stationary as said leg is flexed outwardly by contact of said second edge with said opposing finger edge.

14. A bolt anchoring assembly comprising:

(a) an elongated bolt having a head at one end and threaded from the opposite end for at least a portion of its length;

(b) an expansion shell supported in encircling relation to the threaded portion of said bolt;

(c) a tapered nut threaded on said bolt for radial expansion of said shell upon rotational advancement of said bolt into said nut while restraining said nut and shell against rotation;

(d) a fixed stop surface structurally associated with one of said shell and nut, said surface being spaced radially outward from said bolt and extending axially thereof; and (e) a stop member fixedly extending radially outward from said bolt, said stop surface and stop member being relatively constructed and arranged so that upon rotation of said bolt in a direction tending to unthread it from said nut said stop member contacts said surface and rotates said shell and nut with said bolt, and upon rotation of said bolt in a direction tending to threadedly advance it into said nut said stop member avoids contact with said surface, whereby said shell and nut may be restrained against rotation and said nut is advanced into said shell for radial expansion thereof.

15. The invention according to claim 14 wherein said stop surface is structurally associated with said nut.

16. The invention according to claim 15 wherein said stop member comprises a pin extending radially from said bolt at a position thereon on the opposite side of said nut from said bolt head.

17. The invention according to claim 16 wherein said stop surface comprises one side of a boss extending from the large end of said tapered nut.

18. The invention according to claim 14 wherein said shell includes a collar portion encircling said bolt on the side of said shell opposite said nut, and said stop surface is structurally associated with said collar portion.

19. The invention according to claim 18 wherein said stop member comprises at least one element extending radially outward from said bolt for contact with said collar portion.

20. The invention according to claim 19 wherein said element comprises an ear formed integrally with said bolt.

21. An expansion anchor for threaded engagement with an elongated bolt to secure the latter in a drill hole for reinforcing a rock formation, said bolt having at least one, fixed stop member extending radially outward therefrom adjacent one of the ends of said anchor, the latter comprising:

(a) an expansion shell having a circular collar at one end from which a plurality of radially expansible fingers extend axially of said shell to terminal ends generally defining an opening at the other end;

(b) a tapered nut having an axial, threaded bore and first and second ends of smaller and larger diameter, respectively, then the opening defined by said finger terminal ends, said nut being disposed with said first end extending into said finger opening, whereby said nut is partly encircled by said fingers, said shell collar and said second end of said nut forming the opposite ends of said anchor; and (c) fixed stop means structurally associated with one of said shell collar and second nut end, said stop means being disposed radially outward of said collar and nut openings and having a stop surface extending in a direction axially of said anchor for engagement by said stop member extending radially outward fom said bolt.

22. The invention according to claim 21 wherein said stop means comprises a fixed portion of said nut.

23. The invention according to claim 22 wherein said fixed portion comprises a boss formed integrally with said nut and extending from the larger end thereof.

24. The invention according to claim 21 wherein said stop means comprises a stepped surface of said collar lying in a plane substantially radial to the axis of said nut and shell.

25. The invention according to claim 24 wherein said collar includes inner and outer cylindrical surfaces joined by a substantially planar, annular surface and a surface extending spirally into said inner and annular surfaces from a point at the juncture thereof to a terminus at said stepped surface.

26. The invention according to claim 25 wherein said spiral surface is gradually wider from said juncture point to said stepped surface, the latter being narrower than the distance between said inner and outer cylindrical surfaces.

27. A method of anchoring a reinforcing bolt in a drilled hole in the face of a rock structure by means of combined resin and mechanical anchoring, said mechanical anchoring being of the tapered nut-expansible shell type, said method comprising:

(a) threading one end of an elongated bolt into the tapered nut of an expansion anchor;

(b) drilling a hole of predetermined diameter into the face of a rock structure, said predetermined diameter being approximately equal to the largest cross-sectional dimension of said anchor;

(c) inserting into the hole a breakable cartridge carrying a resin material and a reaction agent in separate compartments;

(d) inserting the end of the bolt with the expansion anchor carried thereon into the hole behind the cartridge to engage and support the latter;

(e) rotating the bolt in the direction tending to withdraw the bolt from threaded engagement with the nut while rotationally coupling the anchor to the bolt for rotation therewith, thereby rupturing the cartridge and mixing the resin and reaction agent; and (f) immediately thereafter rotating the bolt in the direction tending to advance the bolt into the nut while rotationally uncoupling the bolt and anchor, thereby allowing the anchor to be held rotationally stationary, and advancing the bolt into the tapered nut to expand the shell and retain the assembly in position during hardening of the resin material.

28. The method according to claim 27 wherein said bolt has a head at the end opposite said one end, and further including installing a rock-supporting plate on said bolt for support by said head, engaging the head with a socket wrench, rotating the wrench in the direction which would unthread the bolt from the nut for at least a predetermined number of revolutions sufficient to rupture said cartridge and mix the contents of the two compartments thereof, immediately thereafter rotating the wrench in the opposite direction until the expansion anchor is securely fixed within the hole, and immediately thereafter removing the wrench from engagement with the bolt head.

29. The method according to claim 27 and including the further step of assembling with said bolt an element adapted to engage portions of the anchor to provide said rotational coupling and uncoupling of the bolt and anchor during rotation of the bolt in opposite directions.

30. The method according to claim 29 wherein said element is assembled with said bolt after the latter is threaded into said nut, said element being positioned on the opposite side of said nut from the head of the bolt.

31. The method according to claim 29 wherein said element is assembled with said bolt prior to threading the bolt into said nut, said element being positioned between the anchor nut and the head of the bolt.

*32. An expansion shell assembly for anchoring a bolt in a bore hole containing adhesive material comprising:*

*a camming plug threadably engaged to the end of the bolt for axial movement thereon;*

*an expandable shell having a plurality of longitudinally extending fingers spaced from one another by longitudinal slots;*

*said fingers each having an inner surface abutting said camming plug and an outer surface adapted to engage the wall of the bore hole;*

*releasable means securing said camming plug to the bolt for rotating the bolt in a first direction to facilitate mixing of the adhesive material in the bore hole; and*

*said releasable means being operable upon rotation of the bolt in a second direction to permit rotation of the bolt relative to said camming plug and effect advancement of said camming plug on the bolt to exert an outward force upon said inner surfaces of said fingers to expand said fingers in the bore hole and thereby tension the bolt.*

*33. An expansion shell assembly as set forth in claim 32 in which,*

*said releasable means includes means for releasing said shell from connection with the bolt to permit relative rotation between said camming plug and the bolt.*

*34. An expansion shell assembly as set forth in claim 32 which includes,*

*said releasable means being operable to non-rotatably connect said camming plug to the bolt for rotation of said camming plug with the bolt in a counterclockwise direction viewed upwardly into the bore hole.*

*35. An expansion shell assembly as set forth in claim 32 which includes,*

*said releasable means having means for releasing said camming plug from non-rotatable relation with the bolt upon rotation of the bolt in a clockwise direction viewed upwardly into the bore hole to permit axial movement of said camming plug on the bolt.*

*36. Method for supporting a rock formation comprising,*

*inserting an adhesive material in a bore hole of a rock formation,*

*advancing an elongated bolt member having an expansion shell assembly positioned on the end thereof into the bore hole,*

*rotating the bolt member in a first direction to effect mixing of the adhesive material in the bore hole, and*

*thereafter rotating the bolt member in a second direction to effect expansion of the expansion shell assembly in the bore hole to tension the bolt member and thereby securely anchor the bolt member to the rock formation.*

*37. Method for supporting a rock formation as set forth in claim 36 which includes,*

*maintaining the expansion shell assembly in assembled relation on the end of the bolt member to facilitate rotation of the bolt member in the first direction for mixing of the adhesive material in the bore hole.*

*38. Method for supporting a rock formation as set forth in claim 36 which includes,*

*securing a camming plug by a releasable means to the bolt member for rotation with the bolt member,*

*rotating the bolt member with the camming plug secured thereto in the first direction to facilitate mixing of the adhesive material in the bore hole, and*

*rotating the bolt member in the second direction to release the releasable means and permit rotation of the bolt member relative to the camming plug.*

*39. Method for supporting a rock formation as set forth in claim 36 which includes,*

*filling substantially all the voids between the expansion shell assembly and the wall of the bore hole with the mixed adhesive material by rotation of the bolt member in the first direction, and*

*tensioning the bolt member after mixing of the adhesive material in the bore hole upon rotation of the bolt member in the second direction.*

*40. Method for supporting a rock formation as set forth in claim 36 which includes,*

*positioning a roof plate on the end of the bolt member externally of the bore hole, and*

*rotating the bolt member after mixing the adhesive material in the bore hole in the second direction to expand the expansion shell assembly in the bore hole and urge the roof plate into contact with the surface of the rock formation to exert a tension on the bolt.*

*41. Method for supporting a rock formation as set forth in claim 36 which includes,*

*rotating the bolt member in the first direction to position the mixed adhesive material in the voids between the expansion shell assembly and the wall of the bore hole,*

*filling the bore hole surrounding a substantial portion of the bolt member with the mixed adhesive material,*

*rotating the bolt member in the second direction to expand the expansion shell assembly in the bore hole and tension the bolt member, and*

*maintaining the tension on the bolt by securing the expanded shell assembly in the bore hole by the addition of the adhesive material and thereby preventing slippage of the expanded shell assembly in the bore hole.*

* * * * *